United States Patent
Zhang et al.

(10) Patent No.: US 11,245,832 B2
(45) Date of Patent: Feb. 8, 2022

(54) VIDEO RECORDING METHOD AND ELECTRONIC DEVICE

(71) Applicant: Lenovo (Beijing) Co., Ltd., Beijing (CN)

(72) Inventors: Xing Zhang, Beijing (CN); Cong Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/855,800

(22) Filed: Apr. 22, 2020

(65) Prior Publication Data

US 2020/0336672 A1    Oct. 22, 2020

(30) Foreign Application Priority Data

Apr. 22, 2019   (CN) .......................... 201910327736.2

(51) Int. Cl.
| | |
|---|---|
| *H04N 5/232* | (2006.01) |
| *G06T 7/80* | (2017.01) |
| *H04N 5/222* | (2006.01) |
| *H04N 5/225* | (2006.01) |
| *H04N 5/77* | (2006.01) |
| *H04N 17/00* | (2006.01) |
| *H04M 1/02* | (2006.01) |

(52) U.S. Cl.
CPC ......... *H04N 5/232121* (2018.08); *G06T 7/80* (2017.01); *H04N 5/2226* (2013.01); *H04N 5/2254* (2013.01); *H04N 5/232125* (2018.08)

(58) Field of Classification Search
CPC ....... H04N 5/232121; H04N 5/232125; H04N 5/23212; H04N 5/2226
See application file for complete search history.

(56) References Cited

U.S. PATENT DOCUMENTS

2012/0327266 A1* 12/2012 Prentice ............. H04N 5/23212
                                                                 348/231.99
2016/0147131 A1*  5/2016 Richards ............. H04N 5/2258
                                                                 348/187

FOREIGN PATENT DOCUMENTS

| CN | 103685962 A | 3/2014 |
|---|---|---|
| CN | 103986877 A | 8/2014 |
| CN | 104333703 A | 2/2015 |
| CN | 105100617 A | 11/2015 |
| CN | 106506957 A | 3/2017 |
| CN | 106610553 A | 5/2017 |

* cited by examiner

*Primary Examiner* — Christopher K Peterson
(74) *Attorney, Agent, or Firm* — Anova Law Group, PLLC (57) ABSTRACT

A video recording method is disclosed. The method includes receiving video recording instructions; monitoring an object distance between an object to-be-recorded and a lens of a camera; if the object distance between the object to-be-recorded and the lens is within a first range, controlling a first camera to focus based on the object distance, wherein different object distances within the first range correspond to different focus points; and if the object distance between the object to-be-recorded and the lens is within a second range, controlling a second camera to focus at a hyperfocal length, wherein different object distances within the second range correspond to a same focus point.

18 Claims, 4 Drawing Sheets

VIDEO RECORDING METHOD AND ELECTRONIC DEVICE

CROSS-REFERENCE TO RELATED APPLICATION

This application claims priority to Chinese Patent Application No. 201910327736.2, filed on Apr. 22, 2019, the entire content of which is incorporated herein by reference.

TECHNICAL FIELD

The present disclosure relates to a video recording method and an electronic device.

BACKGROUND

With the development of science and technology, an electronic device such as a smartphone, a tablet, a notebook computer, etc., becomes a tool that is essential in people's daily life. Among many functions of the electronic devices such as smartphones, tablets, etc., video recording is one of the most important functions. To improve video recording quality, an electronic device such as a smartphone generally has an automatic focusing function. However, during automatic focusing of a camera, the electronic device often needs to move a lens repeatedly to focus. As such, the electronic device needs to pull out or retract the lens repeatedly, which causes a slow focusing process and impairs user experience.

SUMMARY

Embodiments of the present disclosure provide a video recording method. The video recording method includes receiving video recording instructions; monitoring an object distance between an object to-be-recorded and a lens of a camera; if the object distance between the object to-be-recorded and the lens is within a first range, controlling a first camera to focus based on the object distance, wherein different object distances within the first range correspond to different focus points; and if the object distance between the object to-be-recorded and the lens is within a second range, controlling a second camera to focus at a hyperfocal length, wherein different object distances within the second range correspond to a same focus point.

Embodiments of the present disclosure provide an electronic device, a first camera; a second camera; a controller, configured to receive video recording instructions, and respond to the video recording instructions to record a video during a video recording process by: monitoring an object distance between an object to-be-recorded and a lens of a camera; if the object distance between the object to-be-recorded and the lens is within a first range, controlling a first camera to focus based on the object distance, wherein different object distances within the first range correspond to different focus points; and if the object distance between the object to-be-recorded and the lens is within a second range, controlling a second camera to focus at a hyperfocal length, wherein different object distances within the second range correspond to a same focus point.

Embodiments of the present disclosure provide an electronic device, including a camera; one or more processors; a storage device, configured to store one or more programs that, when executed by the one or more processors, cause the one or more processors to: receive video recording instructions; monitor an object distance between an object to-be-recorded and a lens of a camera; if the object distance between the object to-be-recorded and the lens is within a first range, control a first camera to focus to capture images based on the object distance, wherein different object distances within the first range correspond to different focus points; and if the object distance between the object to-be-recorded and the lens is within a second range, control a second camera to focus at a hyperfocal length to capture images, different object distances within the second range corresponding to a same focus point.

DETAILED DESCRIPTION OF THE EMBODIMENTS

Embodiments of the present disclosure are described by referring to the accompanying drawings. The description is merely illustrative and does not limit the scope of the present disclosure. To facilitate explanation, many details are described to provide comprehensive understanding of embodiments of the present disclosure. One or a plurality of embodiments can also be implemented without these specific details. In addition, descriptions of well-known structures and techniques are omitted to avoid unnecessarily obscuring the concepts of the present disclosure.

Terms used in the present specification are merely for describing specific embodiments, but do not intent to limit the present disclosure. The terms of "including," "containing," etc., indicate existences of features, operations, and/or components, but do not exclude existences or additions of one or more other features, operations, or components.

All terms used herein (including technical and science terms) have the meaning commonly understood by those skilled in the art, unless otherwise defined. The terms used here should be interpreted as having a meaning consistent with the context of this specification and should not be interpreted ideally or overly stereotypically.

When using an expression similar to "at least one of A, B, or C," etc., in general, it should be interpreted according to the meaning generally understood by those skilled in the art (for example, "having at least one of the devices such as A, B, or C" shall include, but not limited to, devices with A alone, B alone, C alone, A and B, A and C, B and C, and/or A, B, and C, etc.).

The accompanying drawings show some block diagrams and/or flowcharts. Some blocks or combinations of the blocks of the block diagrams and/or flowcharts can be implemented by computer program instructions. The computer program instructions can be provided to a general-purpose computer, a special purpose computer, or a processor of another programmable data processing device. As such, these instructions can be executed by the processor to create a device for implementing functions/operations described in these block diagrams and/or flowcharts. The technology of the present disclosure may be implemented in form of hardware and/or software (including firmware, microcode, etc.). In addition, the technology of the preset disclosure may be a computer program product by storing the instructions in a computer-readable storage medium. This computer program product can be used by or in connection with the execution system.

Embodiments of the present disclosure provide a video recording method. The method includes receiving video recording instructions, and responding to the video recording instructions during a video recording process. Responding to the video recording instructions includes following processes. The electronic device monitors an object distance between an object and lens of a camera. If the object distance between the object to-be-recorded and the lens is within a first range, the electronic device controls the lens of a first camera to focus based on the object distance to capture images. Different object distances within the first range correspond to different focus points. If the object distance between the object to-be-recorded and the lens is within a second range, the electronic device controls the lens of a second camera to focus on a hyperfocal length to capture images. Different object distances within the second range correspond to a same focus point.

Embodiments of the present disclosure provide a video recording method. The method includes, during the video recording, detecting the distance between the object to-be-recorded and the lens of the camera in real time. When the distance therebetween is within a certain range, the camera can focus in one step according to the detected distance between the object to-be-recorded and the lens of the camera. When the distance between the object to-be-recorded and the lens of the camera exceeds a certain distance range, the method makes the lens to focus on the hyperfocal length, which maximizes a clear imaging range of the camera. As such, during the video recording, the camera can quickly focus in one step when the object to-be-recorded moves or is changed. The method avoids the phenomenon that the camera repeatedly moves the lens to focus and refocus.

Figure 1:
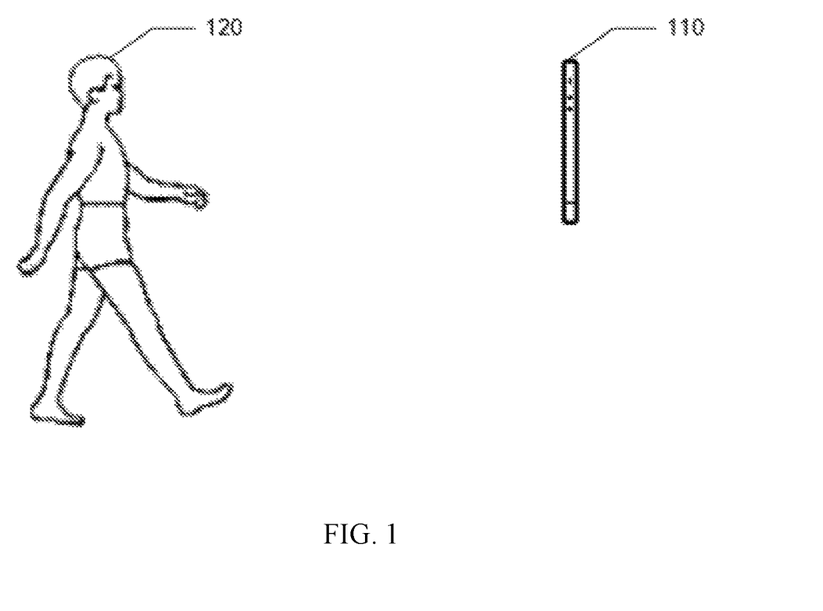
FIG. 1 illustrates an application scenario of a video recording method according to some embodiments of the present disclosure.

FIG. 1 illustrates an application scenario of a video recording method according to some embodiments of the present disclosure. FIG. 1 helps those of skill in the art to understand the technical contents of the present disclosure, but it does not mean that that embodiments of the present disclosure cannot be implemented in other devices, environments, or scenarios.

As shown in FIG. 1, smartphone 110 implements the video recording method of embodiments of the present disclosure. A camera is arranged at smartphone 110. By using the camera for video recording, object to-be-recorded may move forward and backward. Therefore, the camera needs to focus multiple times to make the object to-be-recorded be clearly imaged in a picture.

According to the video recording method of embodiments of the present disclosure, during video recording, the electronic device monitors the distance between object to-be-recorded 120 and the lens of the camera of smartphone 110. If the distance between object to-be-recorded 120 and the lens is within a detectable distance range, the method can use laser focusing or phase detection auto focus (PDAF) focusing to calculate an adjustment amount of the lens according to the distance between object to-be-recorded 120 and the lens. As such, the electronic device can adjust the lens in one step, and the focus point of the lens falls on the object to-be-recorded 120. The electronic device can thus capture clear images of the object to-be-recorded at the imaging plane. If the distance between object to-be-recorded 120 and the lens exceeds a detectable distance range, the laser focusing or PDAF focusing cannot determine a position of the focus point. Thus, the video recording method of embodiments of the present disclosure uses the hyperfocal length to focus, which makes a background depth of field extend from the focus point to infinity. As such, the method maximizes the clear imaging range of the camera, and avoids the problem caused by the lens moving repeatedly to focus.

Figure 2:
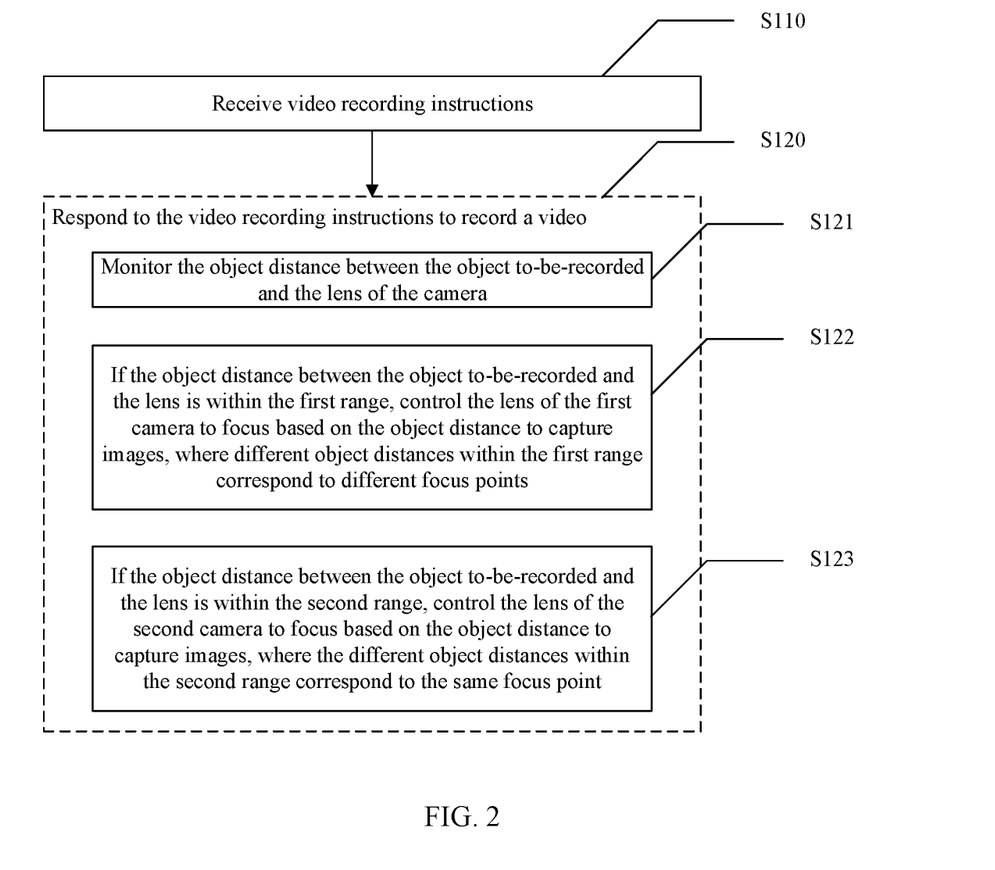
FIG. 2 illustrates a flowchart of the video recording method according to some embodiments of the present disclosure.

FIG. 2 illustrates a flowchart of the video recording method according to some embodiments of the present disclosure.

As shown in FIG. 2, the video recording method includes step S110 to step S120.

At S110, the smartphone receives video recording instructions.

At S120, the smartphone responds to the video recording instructions to record a video.

Step S120 includes step S121 to step S123.

At S121, the smartphone monitors the object distance between the object to-be-recorded and the lens of the camera.

At S122, if the object distance between the object to-be-recorded and the lens is within the first range, the smartphone controls the lens of the first camera to focus based on the object distance to capture images. Different object distances within the first range correspond to different focus points.

At S123, if the object distance between the object to-be-recorded and the lens is within the second range, the smartphone controls the lens of the second camera to focus based on the object distance to capture images. Different object distances within the second range correspond to the same focus point.

In some embodiments, the smartphone can obtain the object distance between the object to-be-recorded and the lens of the camera by using laser ranging or PDAF ranging. The object distance also refers to object to-be-recorded distance.

The method selects a corresponding focusing mode according to relationships between the object distance and the preset first range and between the object distance and the second range.

According to embodiments of the present disclosure, all the object distances larger than a maximum value of the first range belong to the second range.

Figure 3:
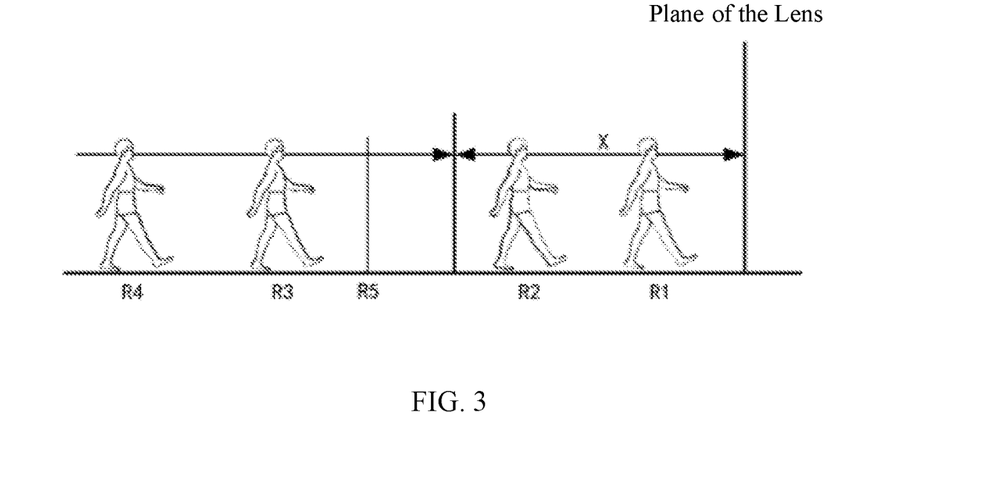
FIG. 3 illustrates a schematic diagram of a first range and a second range according to some embodiments of the present disclosure.

FIG. 3 illustrates a schematic diagram of a first range and a second range according to some embodiments of the present disclosure.

As shown in FIG. 3, the first range is a range with a distance of 0 to X to a plane of the lens. The second range is a range with a distance of X to ∞ to the plane of the lens. X is a preset distance threshold. If the distance between the object to-be-recorded to the lens is shorter than X, the object distance is within the first range. For example, when the object to-be-recorded is at position R1 and position R2 in FIG. 3, the object distance is within the first range. If the distance between the object to-be-recorded to the lens is larger than X, the object distance is within the second range. For example, when the object to-be-recorded is at position R3 and position R4 in FIG. 3, the object distance is within the second range.

The distance threshold X may be a maximum distance that can be detected by a ranging device.

Figure 4:
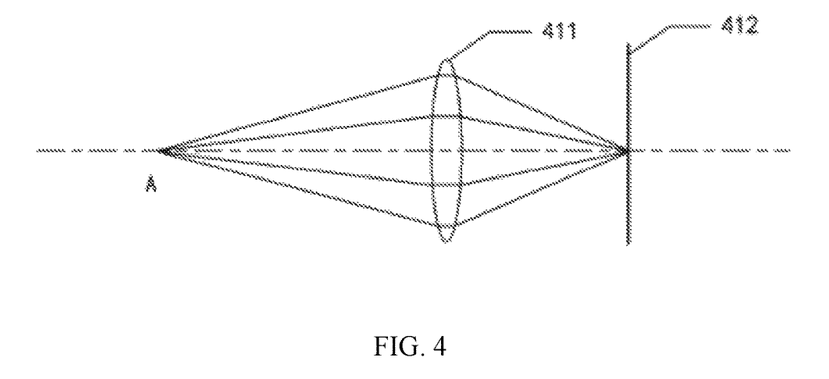
FIG. 4 illustrates a schematic diagram of lens focusing according to some embodiments of the present disclosure.

FIG. 4 illustrates a schematic diagram of lens focusing according to some embodiments of the present disclosure.

As shown in FIG. 4, focusing refers to adjusting an image distance, that is, adjusting a distance between lens 411 and imaging plane 412. When lens 411 and imaging plane 412 inside the camera are separated by different distances, focus point A in front of the lens also moves back and forth. To make a certain object in front of the lens be clearly imaged at the imaging plane, the electronic device needs to place the lens focus point corresponding to the distance between lens 411 and imaging plane 412 on the object to-be-recorded.

In some embodiments, when the object distance between the object to-be-recorded and the lens is within the first range, the method uses a first focusing mode to focus. The first focusing mode may be an adjustment parameter calculated according to the object distance. That is, the method can calculate how long a distance the lens moves from the current position according to the object distance, so that the lens can focus on the subject, then control the lens to move the corresponding distance, and focus in one step. The first focusing mode may be, for example, the laser focusing or the PDAF focusing.

Different object distances within the first range correspond to different focus points. Since the focus point always falls on the object to-be-recorded in the first range, the focus point changes when the object to-be-recorded moves. That is, different object distances correspond to different focus points. As shown in FIG. 3, when the object to-be-recorded is at position R1, the focus point is at position R1. When the object to-be-recorded moves from position R1 to position R2, the focus point is at position R2.

However, a maximum distance that a ranging method such as the laser ranging or the PDAF ranging can measure is limited. Beyond this maximum distance, the method cannot use the first focusing mode to focus. Thus, the method of embodiments of the present disclosure fixes the focus point at a certain point, for example, at the hyperfocal point. As such, the method can avoid moving the lens repeatedly to focus, and ensure an imaging quality.

Figure 5:
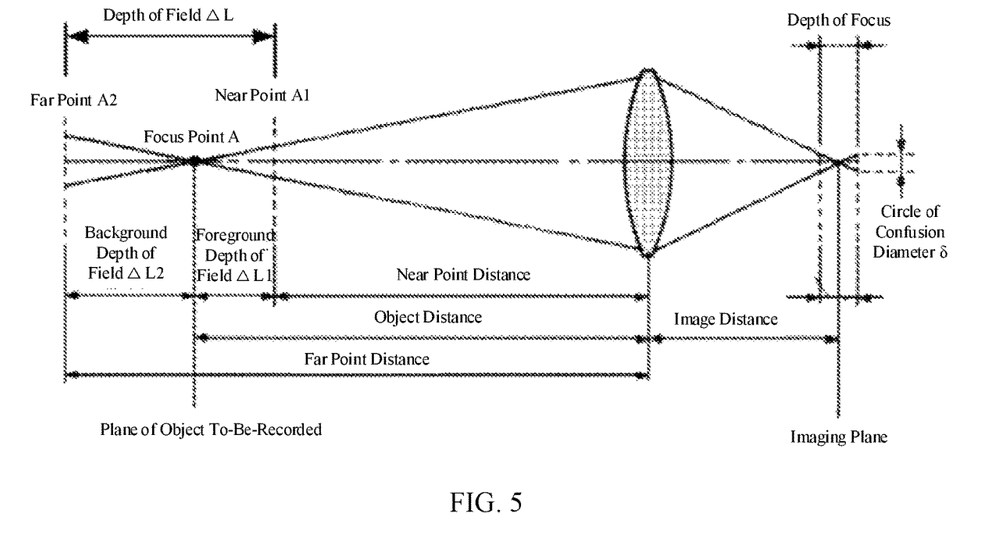
FIG. 5 illustrates a schematic diagram of position relationship among an object to-be-recorded, lens, and an imaging plane according to some embodiments of the present disclosure.

FIG. 5 illustrates a schematic diagram of position relationship among an object to-be-recorded, lens, and an imaging plane according to some embodiments of the present disclosure.

As shown in FIG. 5, the distance between the object to-be-recorded and the lens is the object distance. The distance between the lens and the imaging plane is the image distance.

When focusing, the object to-be-recorded is clearly imaged at the imaging plane through the lens, and foreground and background of the focus point are also imaged at the imaging plane. As long as imaged circles of confusion of the foreground and the background are equal to or less than an allowable circle of confusion diameter 6, objects within the foreground and the background are imaged clearly. Thus, the image has a clear range, that is, the depth of field A L. A circle of confusion exists before and after the focal point. A distance between the two circles is called a depth of focus. The depth of focus corresponds to the depth of field.

The depth of field is divided into foreground depth of field A L1 and background depth of field A L2 with the focus point as the boundary. A point corresponding to the foreground depth is near point A1. A distance between near point A1 and the lens is called a near point distance. A point corresponding to the background depth of field is far point A2. A distance between far point A2 and the lens is a far point distance. Hereinafter, the distance between the focus point and the lens refers as a focusing distance.

Table 1 shows the relationship among the focusing distance, the near point distance and the far point distance when a lens focal length is 50 mm and an aperture value is 8. As shown in table 1, within a certain range, the depth of field increases when the lens focusing distance increases. When the lens focuses on the hyperfocal point, the background depth of field reaches infinity. In embodiments of the present disclosure, the lens focusing at a hyperfocal length refers to the background depth of field corresponding to the lens focus point reaching infinity.

TABLE 1 (m)

| Focusing Distance | 0.75 | 2.5 | 4 | 5.5 | 10 | 30 | 50 |
|---|---|---|---|---|---|---|---|
| Near Point Distance | 0.72 | 2.16 | 3.19 | 4.08 | 6.11 | 10.3 | 11.9 |
| Far Point Distance | 0.79 | 2.96 | 5.35 | 8.45 | 27.5 | ∞ | ∞ |

Different object distances within the second range correspond to the same focus point. When the object to-be-recorded is in the second range, no matter how the distance between the object to-be-recorded and the lens changes, the distance between the lens and the imaging plane always remains the same. As such, the focus point of the lens is always fixed at one position. As shown in FIG. 3, when the object to-be-recorded is in the second range, the focus point is always fixed at hyperfocal point R5. For example, when the object to-be-recorded is at position R3, the focus point is at position R5. When the object to-be-recorded moves from position R1 to position R2, the focus point is also at position R5.

When the object to-be-recorded is in the second range, the electronic device makes the lens focus at the hyperfocal length, and makes the background depth of field of the focus point reach infinity. Thus, the method can avoid moving the lens repeatedly to focus, and ensure the image quality.

In some embodiments, the first camera and the second camera may refer to a same camera, that is, during the video recording, the same camera is used for the video recording and focusing. The camera adjusts the distance between the lens of the camera and the imaging plane according to the object distance between the object to-be-recorded and the lens. When the object distance is within the first range, the camera adjusts the distance between the lens and the imaging plane based on the object distance. When the object distance is within the second range, the electronic device uses the camera to focus at a hyperfocal length, and moves the lens from a current position to a certain position. The electronic device maintains the lens at the position, so that the focus point of the lens is fixed at the hyperfocal point.

In some embodiments, the first camera and the second camera are different cameras.

The method uses different cameras to capture images during the video recording according to the object distances within different ranges. As such, a video file generated by responding to the video recording instructions may include the images captured by different cameras.

In some embodiments, the first camera and the second camera may be, for example, two different rear cameras at the smartphone. During the video recording, the smartphone can switch among different cameras for the video recording according to the object distance. For example, when the object distance is within the first range, the first camera adjusts the distance between the lens and the imaging plane based on the object distance. When the object distance is within the second range, the smartphone switches from the first camera to the second camera for the video recording. The second camera focuses at the hyperfocal length and maintains the lens fixed at a certain position. As such, the second camera fixes the focus point of the lens and make the background depth of field corresponding to the focus point reach infinity.

Figure 6:
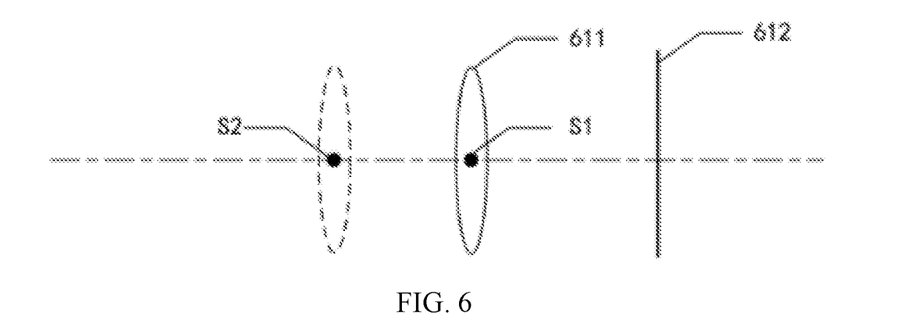
FIG. 6 illustrates a schematic diagram of a lens moving position according to some embodiments of the present disclosure.

FIG. 6 illustrates a schematic diagram of a lens moving position according to some embodiments of the present disclosure.

As shown in FIG. 6, controlling the lens to focus at the hyperfocal length to focus and capture images includes controlling lens 611 of the second camera to move directly from the current position to calibration position S2, such that lens 611 of the second camera focuses on the hyperfocal point. The image distance corresponding to the lens of the second camera focusing on the hyperfocal point is shorter than or equal to the maximum image distance of the lens of the second camera.

In some embodiments, calibration position S2 refers to the position, where the lens is, when the lens focuses at the hyperfocal length. When lens 611 is at calibration position S2, a distance between lens 611 and imaging plane 612 is a preset distance. When the distance between lens 611 and imaging plane 612 is the preset distance, the distance between the focus point of the lens and the lens is the hyperfocal length. The hyperfocal length is larger than the distance threshold X.

When the first camera and the second camera are different cameras, during the video recording, the electronic device may fix the lens of the second camera at calibration position S2. When the object to-be-recorded enters the second range from the first range, the smartphone switches from the first camera to the second camera to record, that is, the smartphone make the lens to focus at the hyperfocal length.

When the first camera and the second camera are the same camera, during the video recording, the object to-be-recorded enters the second range from the first range, the smartphone moves the lens of the camera from the current position directly to the calibration position. When the object to-be-recorded is in the second range, the smartphone fixes the lens of the camera at the calibration position to fix the focus point and make the lens to focus at the hyperfocal length.

The image distance corresponding to the lens of the second camera focusing on the hyperfocal point is shorter than or equal to the maximum image distance of the lens of the second camera. The camera has a limited space. Therefore, the lens of the camera has a limited moving range. An end of a moving path is an extreme position of the lens. The lens cannot move to exceed its extreme position. When the lens is located at the extreme position away from the imaging plane, the distance between the lens and the imaging plan is the maximum image distance. When the lens is at the calibration position, the image distance between the lens and the imaging plan is shorter than the maximum image distance.

In some embodiments, controlling the lens to focus at the hyperfocal length to capture images further includes obtaining the calibration position. The calibration position is stored in a storage unit.

In some embodiments, the calibration position is pre-stored in a component of the electronic device, for example, stored in a processor or a storage device. Once the electronic device detects that the object to-be-recorded exceeds the first range, the electronic device can directly call the calibration position and moves the lens according to the calibration position.

In some embodiments, controlling the lens to focus at the hyperfocal length to capture images further includes calculating the calibration position.

Calculating the calibration position includes determining a first value for indicating a foreground depth of field of the hyperfocal point based on the maximum distance that a ranging device can detect and a focus tolerance of the second camera, determining a second value for representing the focusing distance of the hyperfocal point based on the first value and a comparison table of the depth of field and the focusing distance of the second camera, and determining the calibration position based on the second value.

In some embodiments, the electronic device can pre-calculate to obtain the calibration position before executing the above-mentioned method.

The ranging device may be, for example, a laser ranging device. The smartphone first obtains the maximum distance between the object to-be-recorded and the lens that the laser ranging device can detect. The focusing of the camera has a certain tolerance. Therefore, the method can subtract the focus tolerance on the basis of the maximum distance to obtain the first value, which is used to characterize the foreground depth of field of the hyperfocal point. The first value of the foreground depth of field refers to a distance between near point A1 and the lens shown in FIG. 5, that is, the near point distance. According to the pre-stored comparison table of the depth of field, the focusing distance (as shown in FIG. 1), and the near point distance, the smartphone can determine the second value that is used to represent the focusing distance of the hyperfocal point. The second value refers to the distance between the hyperfocal point and the lens. As such, the smartphone can calculate and obtain the corresponding image distance based on the second value to determine the calibration position of the lens.

Embodiments of the present disclosure further provide an electronic device, including the first camera and the second camera, and a controller. The controller is configured to obtain the video recording instructions and respond to the video recording instructions to control the camera for the video recording during the video recording. The controller is further configured to monitor the object distance between the object to-be-recorded and the lens of the object. If the object distance between the object to-be-recorded and the lens is within the first range, the controller is further configured to control the lens of the first camera to focus to capture images based on the object distance. Different object distances within the first range correspond to different focus points. If the object distance between the recorded object and the lens is within the second range, the controller is further configured to control the lens of the second camera to focus at the hyperfocal length to capture images.

Different object distances within the second range correspond to the same focus point.

In some embodiments, the controller controlling the lens to focus at the hyperfocal length to capture images includes controlling the lend of the second camera to move from the current position directly to the calibration position, such that the lens of the second camera focuses on the hyperfocal point. The image distance corresponding to the lens of the second camera focusing on the hyperfocal point is shorter than or equal to the maximum image distance of the lens of the second camera.

In some embodiments, the controller controlling the lens to focus at the hyperfocal length to capture images includes obtaining the calibration position. The calibration position is stored in the storage unit.

In some embodiments, the controller may be firmware, that is, a hardware device with a solidified software program. The controller is configured to execute the video recording method of embodiments of the present disclosure. The video recording method may be made referred to FIGS. 1 to 6 and the above description of the related drawings, which is not repeated here.

Figure 7:
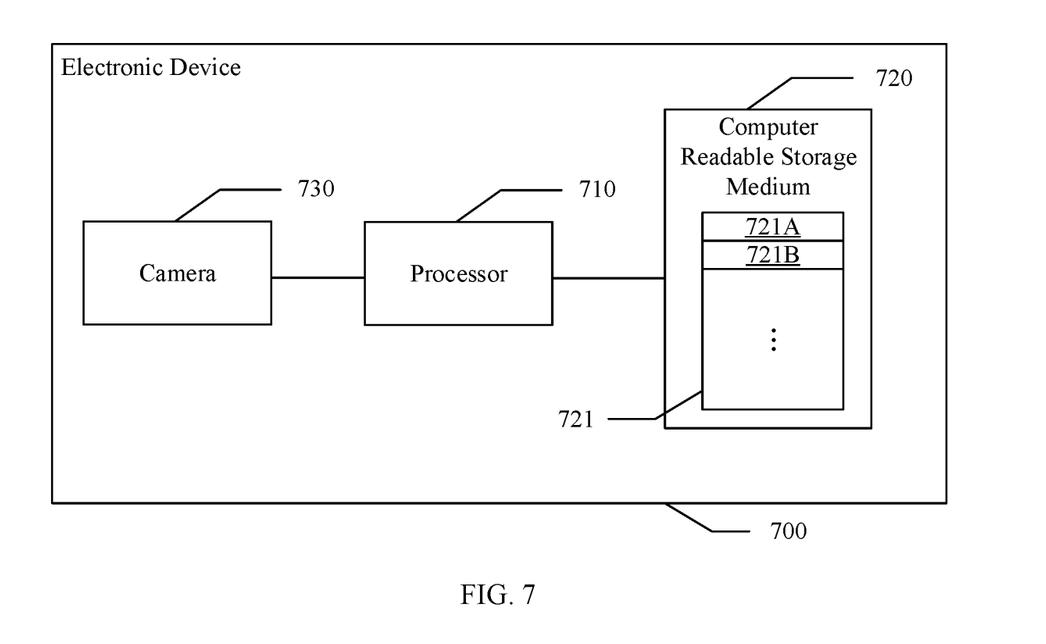
FIG. 7 illustrates a block diagram of an electronic device for implementing the above-mentioned method according to some embodiments of the present disclosure.

FIG. 7 illustrates a block diagram of an electronic device for implementing the above-mentioned method according to some embodiments of the present disclosure. FIG. 7 shows only an example of the electronic device, and should not impose any limitation on the functions and the application scope of embodiments of the present disclosure.

As shown in FIG. 7, electronic device 700 includes processor 710, computer-readable storage medium 720, and camera 730. Electronic device 700 may execute the method according to embodiments of the present disclosure.

In some embodiments, processor 710 may include, for example, a general-purpose microprocessor, an instruction set processor, a related chipset, a dedicated microprocessor (for example, an application specific integrated circuit (ASIC)), etc. Processor 710 may also include an on-board memory for caching purposes. Processor 710 may be a single processing unit or multiple processing units for performing different actions of the method flow according to embodiments of the present disclosure Computer-readable storage medium 720 may be, for example, a non-volatile computer-readable storage medium. Specific examples include, but are not limited to, a magnetic storage device such as a magnetic tape or a hard disk (HDD), an optical storage device such as an optical disk (CD-ROM), memory such as random access memory (RAM) or flash memory, etc.

Computer-readable storage medium 720 may include a computer program 721.

Computer program 721 may include code/computer executable instructions that, when executed by processor 710, cause processor 710 to execute the method or any its variations according to embodiments of the present disclosure.

Computer program 721 may be configured to have, for example, computer program code including computer program modules. For example, in an example embodiment, the code in computer program 721 may include one or more program modules, for example, include module 721A, module 721B, etc. A division method and number of the modules are not fixed. In some embodiments, those of skill in the art may use suitable program modules or program module combinations that, when executed by processor 710, cause processor 710 to execute the method or any of its variations according to embodiments of the present disclosure.

In some embodiments, processor 710 may interact with camera 730 to execute the method or any of its variations according to embodiments of the present disclosure.

To ensure that a clear video can be obtained during the video recording process, embodiments of the present disclosure prevent repeated lens movements for focusing which is caused by the camera unable to focus accurately when the object to-be-recorded is far away from the camera. During the video recording, if the object to-be-recorded is close to the lens, embodiments of the present disclosure perform focusing in one step according to the laser focusing. If the object to-be-recorded is far away from the lens, embodiments of the present disclosure obtain the calibration position according to the calculation and move the lens to the calibration position in one step to realize the hyperfocal length focusing. As such, embodiments of the present disclosure make the lens to focus on the hyperfocal point, and obtain the images which can be obtained by the lens. The images are clear at the hyperfocal point, in the foreground depth of field in front of the hyperfocal point, and in the background depth of field behind the hyperfocal point. The background depth of field behind the hyperfocal point is infinity. Thus, the electronic device realizes quick and accurate focusing during the video recording process to obtain clear images.

The present disclosure also provides a computer-readable storage medium. The computer-readable storage medium may be included in the device/device/system described in the above-mentioned embodiments, or may exist alone without being assembled into the device/device/system. The above-mentioned computer-readable storage medium stores one or more programs. When the above one or more programs are executed, the electronic device implements the method according to some embodiments of the present disclosure.

In some embodiments of the present disclosure, the computer-readable storage medium may be a non-volatile computer-readable storage medium, which may include, but is not limited to, a portable computer disk, a hard disk, a random access memory (RAM), and a read-only memory (ROM), an erasable programmable read-only memory (EPROM or flash memory), a portable compact disk read-only memory (CD-ROM), an optical storage device, a magnetic storage device, or any suitable combination there above. In the present disclosure, the computer-readable storage medium may be any physical medium that contains or stores a program. The program may be used by or in combination with an instruction execution system, device, or device.

The flowchart and block diagrams in the drawings illustrate architectures, functions, and operations of the possible implementations of systems, methods, and computer program products according to embodiments of the present disclosure. Each block in the flowchart or block diagram may represent a module, a program segment, or a part of code, which contains one or more of executable instructions for implementing defined logic functions. In some optional implementations, the functions marked in the blocks may also occur in an order different from that marked in the drawings. For example, two connected blocks may be executed in parallel, in some embodiments, they can also be executed in a reverse order, depending on the functions involved. Each block in the block diagrams or flowcharts, and a combination of blocks in the block diagrams or flowcharts, may be implemented with a dedicated hardware-based system that performs the specified function or operation, or may be implemented with a combination of dedicated hardware and computer instructions.

Those of skill in the art should understand that features described in embodiments and/or claims of the present disclosure may be grouped and/or combined in various ways, even these groups or combinations are not described in the present disclosure. Without departing the spirit and teaching of the present disclosure, the features described in embodiments and/or claims of the present disclosure may be grouped and combined in various ways. All the groups and combinations are within the scope of the present disclosure.

Although the present disclosure has been shown and described by referring to specific exemplary embodiments of the present disclosure, those skilled in the art should understand that without departing from the spirit and scope of the present disclosure as defined by the appended claims and their equivalents, various changes in form and details are made to the present disclosure. Therefore, the scope of the present disclosure should not be limited to the above-described embodiments, but should be determined not only by the appended claims but also by the equivalents of the appended claims.

What is claimed is:

1. A video recording method, comprising:
receiving video recording instructions;
monitoring an object distance between an object to-be-recorded and a lens of a camera;
    in response to the object distance between the object-to-be-recorded and the lens being smaller than a predetermined threshold, controlling a first camera to focus based on the object distance, wherein different object distances being smaller than the predetermined threshold correspond to different focus points; and
    in response to the object distance between the object-to-be-recorded and the lens being equal to or larger than the predetermined threshold, controlling a second camera to focus at a hyperfocal length, wherein different object distances being equal to or larger than the predetermined threshold correspond to a same focus point.

2. The method of claim 1, wherein controlling the second camera to focus at the hyperfocal length includes:
controlling a lens the second camera to move from a current position to a calibration position, the lens of the second camera focusing on a hyperfocal point, an image distance corresponding to the lens of the second camera focusing on the hyperfocal point being shorter than or equal to a maximum image distance of the lens of the second camera.

3. The method of claim 1, wherein controlling the second camera to focus at the hyperfocal length includes:
obtaining a calibration position.

4. The method of claim 3, wherein controlling the second camera to focus at the hyperfocal length includes:
calculating the calibration position, including:
    determining a first value representing a foreground depth of field of the hyperfocal point based on a maximum distance that a ranging device can detect and a focus tolerance of the second camera;
    determining a second value representing a focusing distance of the hyperfocal point based on the first value and a comparison table of a depth of field and the focusing distance of the second camera; and
    determining the calibration position based on the second value.

5. The method of claim 3, wherein the calibration position is pre-stored in a storage device.

6. The method of claim 1, wherein:
the first camera and the second camera are a same camera; or
the first camera and the second camera are different cameras, and during the video recording process, different cameras are used to capture images according to object distances within different ranges.

7. An electronic device, comprising:
a first camera;
a second camera;
a controller, configured to receive video recording instructions, and respond to the video recording instructions to record a video during a video recording process by:
    monitoring an object distance between an object to-be-recorded and a lens of a camera;
    in response to the object distance between the object-to-be-recorded and the lens being smaller than a predetermined threshold, controlling a first camera to focus based on the object distance, wherein different object distances being smaller than the predetermined threshold correspond to different focus points; and
    in response to the object distance between the object-to-be-recorded and the lens being equal to or larger than the predetermined threshold, controlling a second camera to focus at a hyperfocal length, wherein different object distances being equal to or larger than the predetermined threshold correspond to a same focus point.

8. The electronic device of claim 7, wherein the controller is further configured to:
control the second camera to move from a current position to a calibration position, a lens of the second camera focusing on a hyperfocal point, an image distance corresponding to the lens of the second camera focusing on the hyperfocal point being shorter than or equal to a maximum image distance of the lens of the second camera.

9. The electronic device of claim 7, wherein the controller is further configured to:
obtain a calibration position stored at a storage device.

10. The electronic device of claim 7, wherein:
the first camera and the second camera are a same camera; or
the first camera and the second camera are a different cameras, during the video recording process, different cameras being used to capture images according to the object distance within different ranges.

11. The electronic device of claim 10, wherein the controller is further configured to:
calculate the calibration position, including:
    determining a first value representing a foreground depth of field of the hyperfocal point based on a maximum distance that a ranging device can detect and a focus tolerance of the second camera;
    determining a second value representing a focusing distance of the hyperfocal point based on the first value and a comparison table of a depth of field and the focusing distance of the second camera; and
    determining the calibration position based on the second value.

12. The electronic device of claim 11, wherein the calibration position is stored in a storage device.

13. An electronic device, comprising:
a camera;
one or more processors;
a storage device, configured to store one or more programs that, when executed by the one or more processors, cause the one or more processors to:
    receive video recording instructions;
    monitor an object distance between an object to-be-recorded and a lens of a camera;

in response to the object distance between the object-to-be-recorded and the lens being smaller than a predetermined threshold, control a first camera to focus to capture images based on the object distance, wherein different object distances being smaller than the predetermined threshold correspond to different focus points; and in response to the object distance between the object-to-be-recorded and the lens being equal to or larger than the predetermined threshold, control a second camera to focus at a hyperfocal length to capture images, different object distances being equal to or larger than the predetermined threshold corresponding to a same focus point.

14. The electronic device of claim 13, wherein the one or more programs further cause the one or more processors to:
control a lens of the second camera to move from a current position to a calibration position, the lens of the second camera focusing on a hyperfocal point, an image distance corresponding to the lens of the second camera focusing on the hyperfocal point being shorter than or equal to a maximum image distance of the lens of the second camera.

15. The electronic device of claim 13, wherein the one or more programs further cause the one or more processors to: obtain a calibration position stored in a storage device.

16. The electronic device of claim 15, wherein the one or more programs further cause the one or more processors to:
calculate the calibration position, including:
determining a first value representing a foreground depth of field of the hyperfocal point based on a maximum distance that a ranging device can detect and a focus tolerance of the second camera;
determining a second value representing a focusing distance of the hyperfocal point based on the first value and a comparison table of a depth of field and the focusing distance of the second camera; and
determining the calibration position based on the second value.

17. The electronic device of claim 16, wherein the calibration position is stored in a storage device.

18. The electronic device of claim 13, wherein:
the first camera and the second camera are a same cameras; or
the first camera and the second camera are different cameras, during the video recording process, different cameras being used to capture images according to the object distance within different ranges.

* * * * *